(12) United States Patent
Sato (10) Patent No.: US 10,302,234 B2
(45) Date of Patent: May 28, 2019

(54) FLOW-UNDISRUPTED PROCESS (71) Applicant: SUIKEN Co.,Ltd., Shiga (JP)

(72) Inventor: Yasunari Sato, Shiga (JP)

(73) Assignee: SUIKEN CO., LTD., Shiga (JP)

(*) Notice: Subject to any disclaimer, the term of this patent is extended or adjusted under 35 U.S.C. 154(b) by 117 days.

(21) Appl. No.: 15/543,521

(22) PCT Filed: Jan. 26, 2015

(86) PCT No.: PCT/JP2015/051982
§ 371 (c)(1),
(2) Date: Jul. 13, 2017

(87) PCT Pub. No.: WO2016/120961
PCT Pub. Date: Aug. 4, 2016

(65) Prior Publication Data
US 2017/0370514 A1    Dec. 28, 2017

(51) Int. Cl.
*F16L 41/06* (2006.01)
*B23B 41/00* (2006.01)
(Continued)

(52) U.S. Cl.
CPC ............ *F16L 41/06* (2013.01); *B23B 41/00* (2013.01); *F16L 41/086* (2013.01); *F16K 1/22* (2013.01)

(58) Field of Classification Search
CPC .......... F16L 41/06; F16L 41/086; B23B 41/00
See application file for complete search history.

(56) References Cited

U.S. PATENT DOCUMENTS 3,598,141 A * 8/1971 Yano .................. B23B 51/0426
137/318
4,223,925 A    9/1980 Reneau et al.
(Continued)

FOREIGN PATENT DOCUMENTS

JP    H02-039680 B2    9/1990
JP    2001-012678 A    1/2001
(Continued)

OTHER PUBLICATIONS

International Search Report Issued in PCT/JP2015/051982 dated Apr. 21, 2015.

*Primary Examiner* — Craig Schneider
*Assistant Examiner* — Angelisa L Hicks
(74) *Attorney, Agent, or Firm* — Renner, Otto, Boisselle & Sklar, LLP (57) ABSTRACT

The present flow-undisrupted process includes: enclosing a portion of an existing pipe with a sealing case; connecting a boring machine to the sealing case in a non-valve state in which no operation valve is interposed between a projecting pipe portion of the sealing case and the boring machine; forming a circular opening in an area of the existing pipe corresponding to the projecting pipe portion by means of a hole saw of the boring machine; rotating a tee and the boring machine in a circumferential direction of the existing pipe to a position at which the projecting pipe portion is completely past the opening; after the rotation, maintaining a sealed state in which the seal packing prevents a pressure of a fluid inside the existing pipe from being applied to the projecting pipe portion; and removing the boring machine from the projecting pipe portion in the sealed state.

5 Claims, 7 Drawing Sheets (51) Int. Cl.
*F16L 41/08* (2006.01)
*F16K 1/22* (2006.01)

(56) References Cited

U.S. PATENT DOCUMENTS

| | | | |
|---|---|---|---|
| 2005/0098208 A1* | 5/2005 | Topf, Jr. | F16L 41/06 137/15.14 |
| 2009/0065070 A1 | 3/2009 | Jaehyun et al. | |
| 2011/0192469 A1 | 8/2011 | Yamashita et al. | |
| 2013/0000749 A1 | 1/2013 | Sato | |

FOREIGN PATENT DOCUMENTS

| | | |
|---|---|---|
| JP | 2001-012679 A | 1/2001 |
| JP | 2004-125090 A | 4/2004 |
| JP | 2005-103621 A | 4/2005 |
| JP | 2005-147219 A | 6/2005 |
| JP | 2013-155816 A | 8/2013 |
| WO | WO 2008-155943 A1 | 12/2008 |
| WO | WO 2010-050115 A1 | 5/2010 |

* cited by examiner

FLOW-UNDISRUPTED PROCESS

TECHNICAL FIELD

The present invention relates to a flow-undisrupted process of performing a predetermined operation on an existing pipe without disrupting the flow of a fluid through the existing pipe.

BACKGROUND ART

Conventionally, the operation of inserting a butterfly valve into a pipeline without disrupting the flow therethrough has been performed (the first patent document).

However, in the operation of providing a branch off of an existing pipe, a butterfly valve cannot be used as the operation valve and a gate valve has been used as the operation valve.

It has also been proposed to provide a butterfly valve in the branch pipe (the second and third patent documents).

CITATION LIST

Patent Document

[FIRST PATENT DOCUMENT] JP2004-125090 A (front page)
[SECOND PATENT DOCUMENT] JP2001-12678 A (FIGS. 1-3)
[THIRD PATENT DOCUMENT] JP2001-12679 A (FIGS. 1-3)

SUMMARY OF THE INVENTION

In the prior art, however, there is a need for an operation valve separate from the butterfly valve installed in the pipeline. Such a problem occurs not only when installing a butterfly valve but generally in flow-undisrupted processes.

It is an object of the present invention to provide a flow-undisrupted process that can be performed without using an operation gate valve.

The present invention provides a flow-undisrupted process using a tee (a pipe tee) configured to form an opening in a pipe wall of an existing pipe by boring a portion of the pipe wall by means of a boring machine having a hole saw, the tee including:

a sealing case including a plurality of separate cases separated from each other in a circumferential direction of the existing pipe and configured to enclose (surround) a portion of the existing pipe, the sealing case also including a projecting pipe portion formed integral with a first separate case of the plurality of separate cases, the projecting pipe portion projecting in a radial direction of the existing pipe; and at least one seal packing configured to seal between an inner periphery surface of the sealing case and an outer periphery surface of the existing pipe over an area inclusive of the opening;

the flow-undisrupted process including:
a step of enclosing the portion of the existing pipe with the sealing case;
a step of connecting the boring machine to the sealing case in a non-valve state in which no operation valve is interposed (intervenes) between the projecting pipe portion of the sealing case and the boring machine;

a boring step of forming the opening, which is circular, in an area of the existing pipe corresponding to the projecting pipe portion by means of the hole saw of the boring machine;

after the boring step, a first rotation step of rotating the tee and the boring machine in the circumferential direction of the existing pipe to a position at which the projecting pipe portion is completely past (has passed over) the opening;

after the rotation, a sealing step of maintaining a sealed state in which the at least one seal packing prevents a pressure of a fluid inside the existing pipe from being applied to the projecting pipe portion; and a step of removing the boring machine from the projecting pipe portion in the sealed state.

According to the present invention, a flow-undisrupted operation can be performed in a non-valve state, and an operation gate valve, or the like, is not used, thus realizing advantages as follows.

(1) The operation gate valve is not interposed between the first separate case and the boring machine, resulting in a significantly shorter boring stroke. Thus, it is possible to significantly reduce the size of the boring machine.

(2) Also, since the operation gate valve is not interposed, the error of the clearance Δ (FIG. 1) (the accumulated product error) that should be ensured between the hole saw and the existing pipe is small. Thus, the clearance can be set in advance to be small, thereby further shortening the stroke.

(3) Also, after the formation of the opening, the tee is rotated in the circumferential direction of the existing pipe, as opposed to the pipe axis direction of the existing pipe. Thus, the tee will not be elongated in the pipe axis direction.

(4) Also, the inner diameter of the tee will not be large as compared with apparatuses including a rotary valve inside the second separate case.

DESCRIPTION OF EMBODIMENTS

Preferably, the process further includes:
a step of connecting a butterfly valve to the projecting pipe portion from which the boring machine has been removed (i.e., after the step of removing the boring machine); and a second rotation step of rotating the butterfly valve and the tee in the circumferential direction of the existing pipe to a position at which a valve body of the butterfly valve in a valve-closed state covers the opening.

In such a case, the butterfly valve can be attached directly to the tee without using complicated devices.

Preferably, in the first rotation step, the tee and the boring machine are rotated by a first angle in a first direction of the circumferential direction; and in the second rotation step, the tee and the butterfly valve are rotated by about the same amount as the first angle in a second direction, which is opposite to the first direction.

In such a case, by using a stopper defining the opposite ends of rotation, the position of the opening is aligned with the projecting pipe portion.

Preferably, the existing pipe, buried in the ground, is partially exposed through digging;

in the boring step, an axis of the boring machine is set in a horizontal direction orthogonal to a pipe axis direction of the existing pipe; and in the first rotation step, the tee and the boring machine are rotated in the first direction, which is upward, of the circumferential direction.

As in this case, water supply pipelines, and the like, are typically buried in the ground, and water pipes are exposed by digging in order to perform an operation. In the present embodiment, there is no need for an operation gate valve, and the boring machine is downsized, thereby reducing the size of the pit to be dug relative to the prior art.

Preferably, the at least one seal packing includes:

a case packing each attached to the first separate case and another separate case different from the first separate case and configured to seal between the separate cases and also seal between the inner periphery surface of the sealing case and the outer periphery surface of the existing pipe; and a ring packing attached to the first separate case so as to enclose (surround, encircle) the opening of the existing pipe and configured to seal between the projecting pipe portion of the first separate case and the existing pipe, wherein in the sealing step, the sealed state is maintained by the ring packing.

In such a case, the ring packing seals a smaller area than the case packing. Thus, the angle of rotation in the first rotation step will be smaller.

The ring packing does not always need to be provided. For example, while portions of two case packings that extend in the pipe axis direction are in contact with each other, if the portions of the case packings are in contact with the existing pipe across the entire length of the case packing, thereby sealing between the first separate case and the second separate case, there is no need for the ring packing.

In such a case, however, the first angle in the first rotation step will be larger.

Any feature illustrated and/or depicted in conjunction with one of the embodiments described above or the following examples may be used in the same or similar form in one or more of alternative embodiments or alternative examples, and/or may be used in combination with, or in place of, any feature of the alternative embodiments or examples.

EXAMPLES

The present invention will be understood more clearly from the following description of preferred embodiments taken in conjunction with the accompanying documents. However, the embodiments and the drawings are merely illustrative, and shall not be relied upon in defining the scope of the present invention. The scope of the present invention shall be defined only by the appended claims. In the accompanying drawings, like reference numerals denote like components throughout the plurality of figures.

Example 1

An example of the present invention will now be described with reference to the drawings.

FIG. 1 to FIG. 6C show Example 1. Prior to description of the flow-undisrupted process of the present invention, an apparatus used in this process will be described.

Branching Unit (an Example of the Tee) 2

Figure 1:
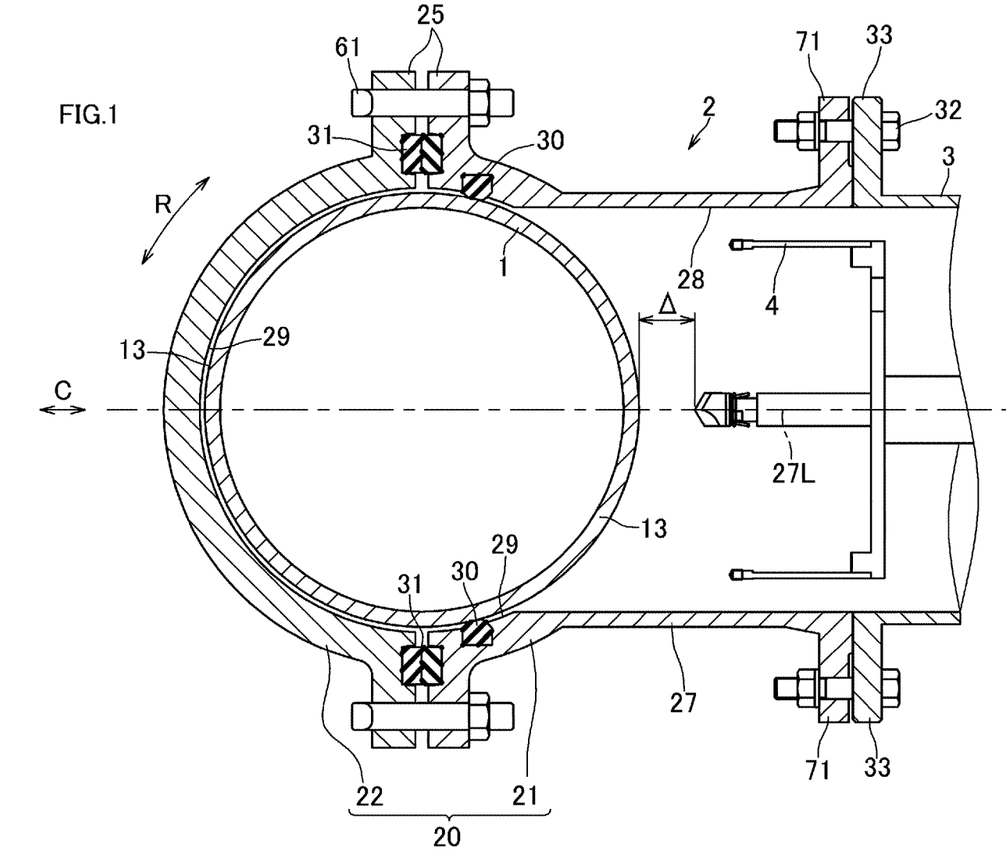
FIG. 1 is a horizontal cross-sectional view showing a tee according to one example of the method of the present invention.

A branching unit 2 shown in FIG. 1 is used in flow-undisrupted boring, in which a boring machine 3 having a hole saw 4 is used to bore a portion of a pipe wall 12 of an existing pipe 1 to provide a branch off of the existing pipe 1 while a fluid (e.g., water, etc.) is flowing through the inside of the pipe, as shown in FIG. 1 and FIG. 2A to FIG. 2C.

As shown in FIG. 1, the branching unit 2 includes a sealing case 20 for enclosing the existing pipe 1. The sealing case 20 includes first and second separate cases 21 and 22 which are separated from each other in the circumferential direction R of the existing pipe 1, and a branch pipe portion 27 formed integral with the first separate case 21 and branching off of the existing pipe 1 by protruding in the radical direction C of the existing pipe 1.

Separate Cases 21 and 22:

The first and second separate cases 21 and 22 are separated from each other along a virtual plane that is generally orthogonal to an axis 27L of the branch pipe portion 27. The separate cases 21 and 22 are attached from outside to the existing pipe 1 from opposite sides in the radial direction C of the existing pipe 1 and are assembled together by fastening coupling portions 25 thereof to each other by assembling bolts 61.

Figure 5A:
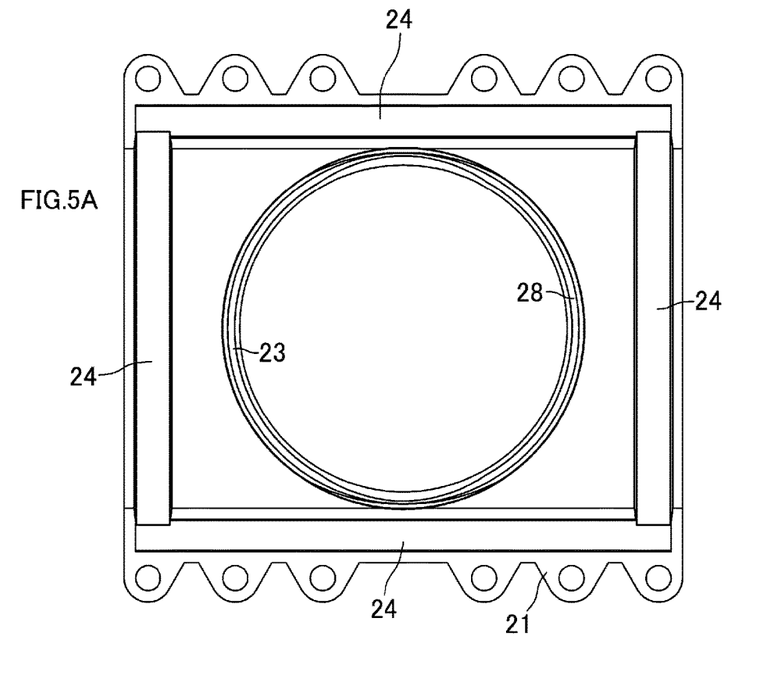
FIG. 5A is a back view of a first separate case.
Figure 5B:
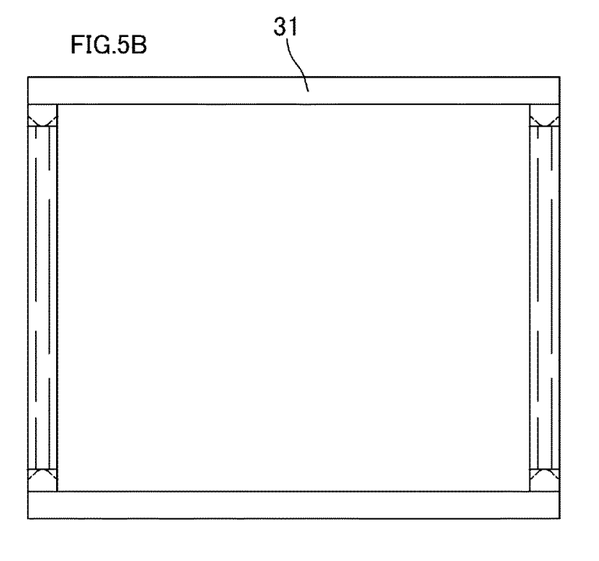
FIG. 5B and FIG. 5C are a front view and a side view, respectively, of a case packing.
Figure 5C:
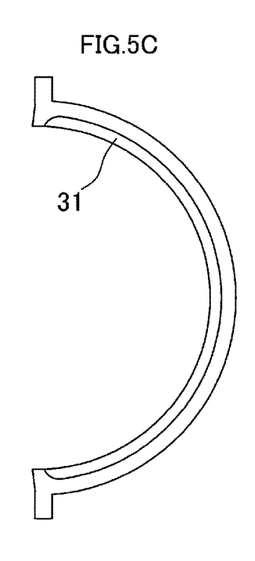
Figure 6A:
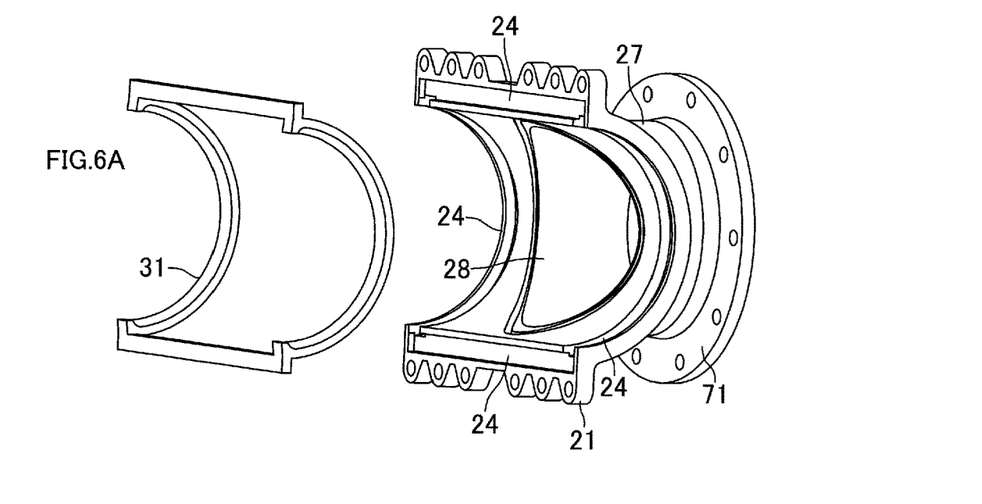
FIG. 6A is an exploded perspective view showing a case packing and the first separate case.

The separate cases 21 and 22 each have an inner periphery surface 29 which is curved generally along an outer periphery surface 13 of the existing pipe 1. Groove shaped packing attachment portions 24 shown in FIG. 5A and FIG. 6A are formed along the coupling portions 25 and opposite end portions of the inner periphery surface 29 in the pipe axis direction of the existing pipe 1 of the separate cases 21 and 22. Case packings (rubber packings) 31 are attached to the packing attachment portions 24, thereby sealing between the existing pipe 1 and the sealing case 20 and between the first separate case 21 and the second separate case 22 of FIG. 1. Note that in the assembled state described above, the opposite end portions of the separate cases 21 and 22 in the pipe axis direction of the existing pipe 1 are sealed by the case packing 31 with respect to the outer periphery surface 13 of the existing pipe 1.

Branch Pipe Portion 27:

As shown in FIG. 1, the boring machine 3 is attached to a joint portion 71, which is like a flange, for example, of the branch pipe portion 27. As the hole saw 4 is passed toward the boring direction C1 extending in the radial direction of the existing pipe 1 through a branch hole 28 of the branch pipe portion 27, as shown in FIG. 2B, the pipe wall 12 of the existing pipe 1 is cut, thereby boring a circular opening 11 in the existing pipe 1, as shown in FIG. 2C.

A center drill 41 for positioning the hole saw 4 is provided at the center of rotation of the hole saw 4 so as to protrude toward the existing pipe 1. Note that although not shown in the figures, the drill 41 may be provided with a snap ring well known in the art for preventing a curved cut piece 14 from falling.

Figure 6B:
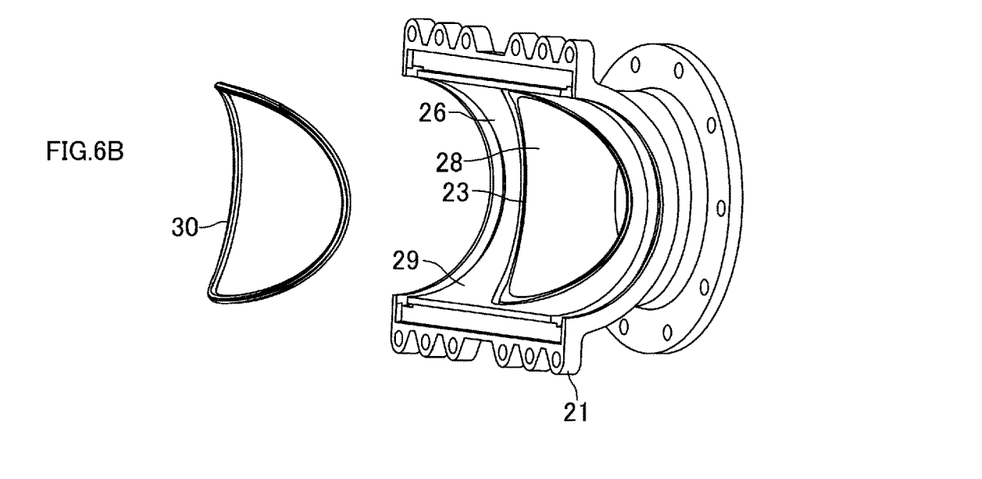
FIG. 6B is an exploded perspective view showing a ring packing and the first separate case.
Figure 6C:
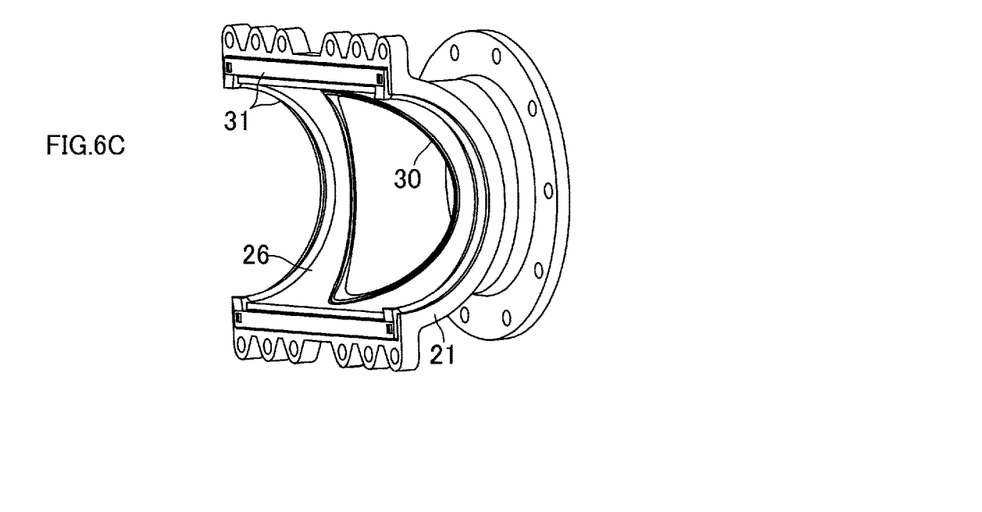
FIG. 6C is a perspective view showing a state in which these packings are attached to the first separate case.

A ring packing (rubber ring) 30 of FIG. 6B different from the case packing 31 is attached to the first separate case 21 of FIG. 6A. The ring packing (rubber ring) 30 is attached to an area of the first separate case 21 corresponding to around the rim of the opening 11 shown in FIG. 2C, thereby sealing between a cylindrical portion 26 of the first separate case 21 and the existing pipe 1.

More specifically, as shown in FIG. 5A and FIG. 6B, a circular packing attachment portion 23 is formed on the inner periphery surface 29 of the first separate case 21 that opposes (faces) the existing pipe 1 (FIG. 1). The packing attachment portion 23 is groove-shaped, and is provided on the inner periphery surface 29 of the portion 26 in proximity to the branch hole 28. The ring packing (rubber ring) 30 is firmly attached to the packing attachment portion 23 by bonding, baking, etc.

Flow-undisrupted Process:

Next, a process using the branching unit 2 of FIG. 1 will be described.

First, with a fluid flowing inside the existing pipe 1 of FIG. 1, the branching unit 2 is attached so as to enclose the outer periphery surface 13 of the existing pipe 1. After the attachment, the operator assembles together the separate cases 21 and 22 with the assembling bolts 61.

Figure 2A:
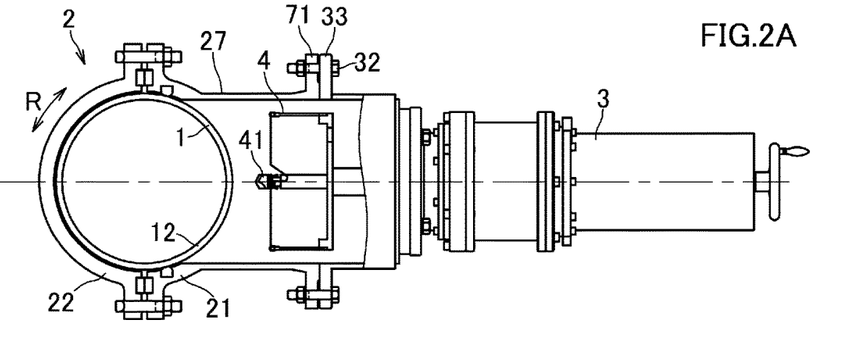
FIG. 2A, FIG. 2B and FIG. 2C are horizontal cross-sectional views showing a flow-undisrupted boring process.
Figure 2B:
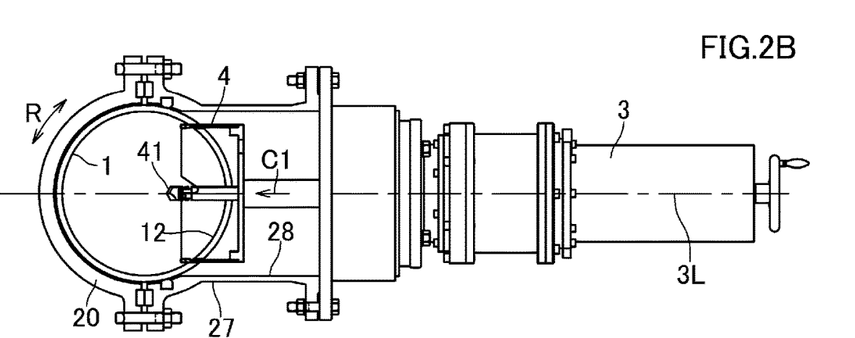
Figure 2C:
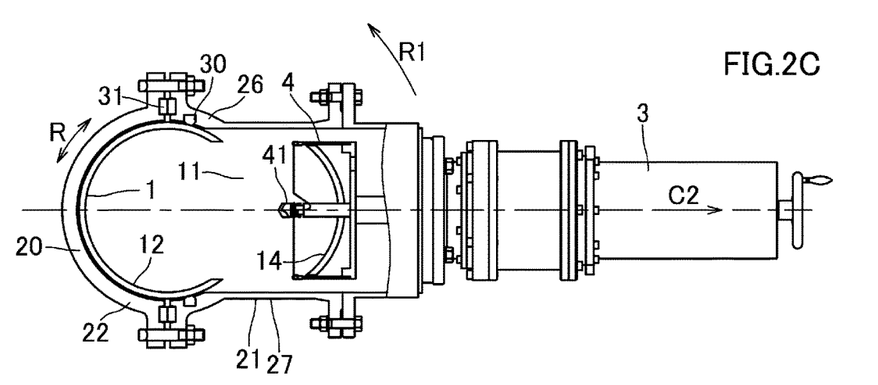

Then, as shown in FIG. 2A, the operator attaches joint portions 33 of the boring machine 3 to the joint portions 71 of the branch pipe portion 27 using bolts 32. Thus, the branching unit 2 airtightly encloses a portion of the existing pipe 1. In the airtight state, an operation valve is not present between the branch pipe portion 27 and the boring machine 3. That is, it is a non-valve state.

After the enclosure, as the hole saw 4 is moved in the boring direction C1 toward the existing pipe 1 while spinning the hole saw 4 as shown in FIG. 2A to FIG. 2B, the center drill 41 cuts the pipe wall 12 of the existing pipe 1, thereby positioning the hole saw 4 spinning about the center drill 41 with respect to the existing pipe 1. Then, as shown in FIG. 2B, a portion of the pipe wall 12 of the existing pipe 1 is cut off by the hole saw 4, thus forming the opening 11 of FIG. 2C. After boring by the center drill 41 and the hole saw 4, the hole saw 4 is moved in the retracting direction C2 as shown in FIG. 2C.

In the state of FIG. 2B and FIG. 2C, the fluid inside the existing pipe 1 flows into the branch pipe portion 27. However, the ring packing (rubber ring) 30 is in contact with the existing pipe 1 and the first separate case 21, thereby sealing between the branch pipe portion 27 and the second separate case 22. Therefore, the fluid inside the existing pipe 1 will not leak out of the branch pipe portion 27.

Moreover, in this state, the case packing 31 seals between the first separate case 21 and the second separate case 22, and also seals between the sealing case 20 and the existing pipe 1. Therefore, even if the fluid inside the existing pipe 1 leaks out of the branch pipe portion 27 into the second separate case 22, the fluid inside the existing pipe 1 will not leak out of the branching unit 2.

Figures 3A, 3B:
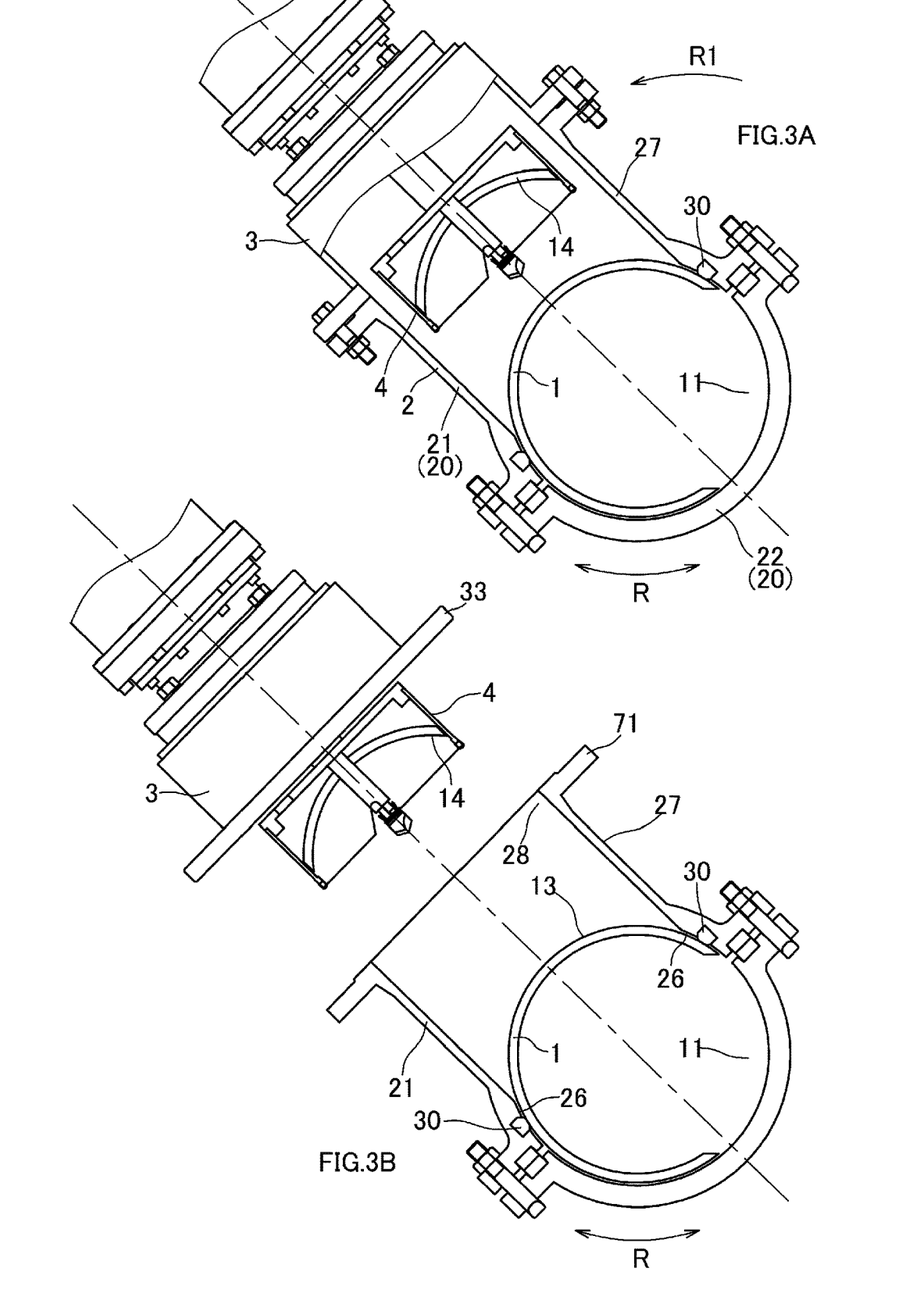
FIG. 3A and FIG. 3B are horizontal cross-sectional views showing a flow-undisrupted process.

After the boring step of FIG. 2C, a first rotation step is performed, in which the tee 2 and the boring machine 3 are rotated in the circumferential direction R of the existing pipe 1 to a position at which the entirety of the ring packing 30 is completely past the opening 11 as shown in FIG. 3A. In the first rotation step, the tee 2 and the boring machine 3 are rotated by a first angle in the first direction R1 of the circumferential direction R.

During the rotation, the ring packing 30 attached to the first separate case 21 of FIG. 2C moves across the opening 11 of FIG. 3A in the circumferential direction R. Therefore, the pressure of the fluid inside the existing pipe 1 acts also upon the second separate case 22. However, as described above, the case packing 31 seals between the sealing case 20 and the existing pipe 1. Therefore, the fluid will not gush out of the sealing case 20.

After the rotation, a sealed state is maintained, in which the pressure of the fluid inside the existing pipe 1 is prevented by the ring packing 30 from being applied to the branch pipe portion 27. That is, after the rotation, the ring packing 30 maintains the state of sealing between the cylindrical portion 26 of the first separate case 21 and the existing pipe 1. In the sealed state, the boring machine 3 of FIG. 3B is removed from the branch pipe portion 27.

In the sealed state after the rotation, the ring packing 30 is in contact with the outer periphery surface 13 of the existing pipe 1, not overlapping with the opening 11, across the entire circumference of the ring packing 30. Therefore, the fluid pressure applied from the opening 11 is received by the ring packing 30 so as not to act upon the branch hole 28. As a result, it is possible to remove the boring machine 3 in the non-valve state.

Figure 4A:
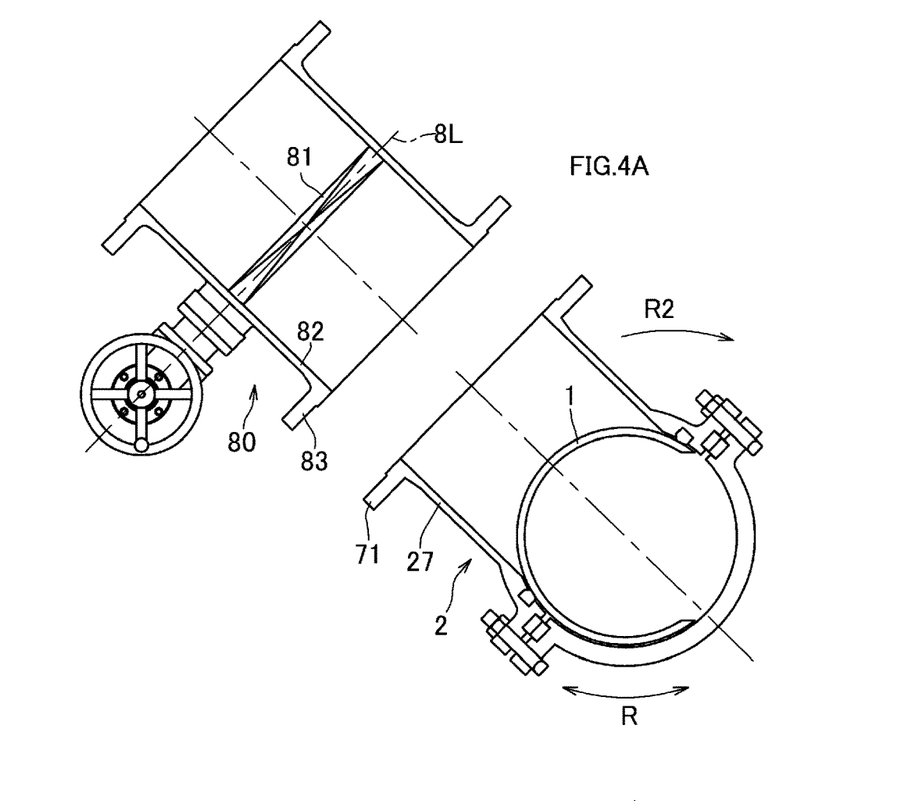
FIG. 4A and FIG. 4B are horizontal cross-sectional views showing a step of connecting a butterfly valve to a tee.

A valve is connected to the branch pipe portion 27 FIG. 3B, from which the boring machine 3 has been removed. That is, after the removal of the boring machine 3, a butterfly valve 80, for example, is attached to the branch pipe portion 27, as shown in FIG. 4A, and joint portions 83 formed on a valve housing 82 of the butterfly valve 80 are connected to the joint portions 71 of the branch pipe portion 27 using bolts 84 (FIG. 4B).

After the connection, a second rotation step is performed, in which the butterfly valve 80 and the tee 2 are rotated in the circumferential direction R of the existing pipe 1 to a position at which a valve body 81 of the butterfly valve 80 in the valve-closed state covers the opening 11. In the second rotation step, the tee 2 and the butterfly valve 80 are rotated by about the same amount as the first angle in the second direction R2, which is opposite to the first direction R1 (FIG. 3A).

After the second rotation step, the ring packing 30 and the case packing 31 seal between the existing pipe 1 and the tee 2 in a similar state to that of FIG. 2C.

Figure 4B:
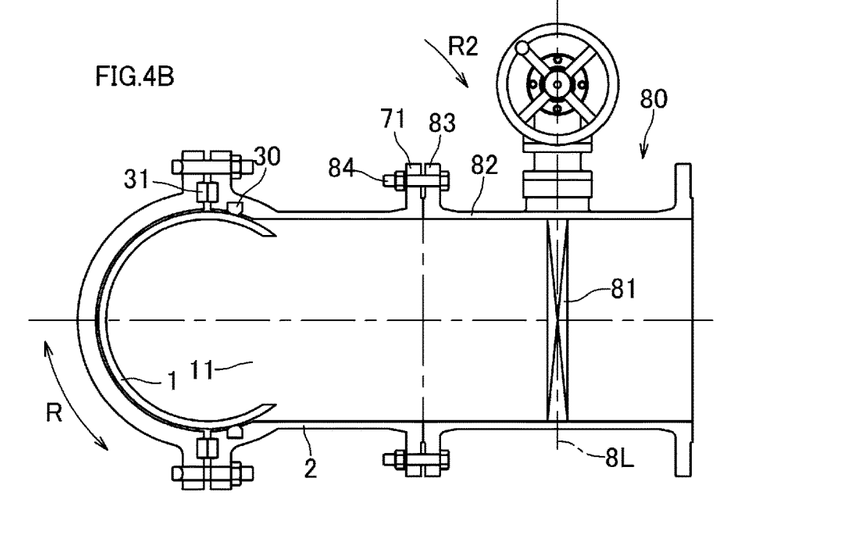

Thus, the operation of connecting a branching pipe to the existing pipe 1 of FIG. 4B is completed. As is well known in the art, the valve body 81 of the butterfly valve 80 is disc-shaped and rotates by about 90° about the axial direction 8L inside the cylindrical valve housing 82, thereby making it easy to adjust the flow rate through the branching pipe, as opposed to a gate valve.

In the present flow-undisrupted process, the existing pipe 1, buried in the ground, is partially exposed through digging. Prior to the boring step of FIG. 2A to FIG. 2C, the existing pipe 1, buried in the ground, is partially exposed through digging. In the boring step of FIG. 2B, the axis 3L of the boring machine 3 is set in the horizontal direction orthogonal to the pipe axis direction of the existing pipe 1. In the first rotation step of FIG. 3A, the tee 2 and the boring machine 3 are rotated in the first direction R1, which is upward, of the circumferential direction R.

In such a case, even though the tee 2 and the boring machine 3 are rotated, the size of the pit to be formed by digging will not be much larger than that with an ordinary water-undisrupted boring operation using a gate valve.

Figure 7A:
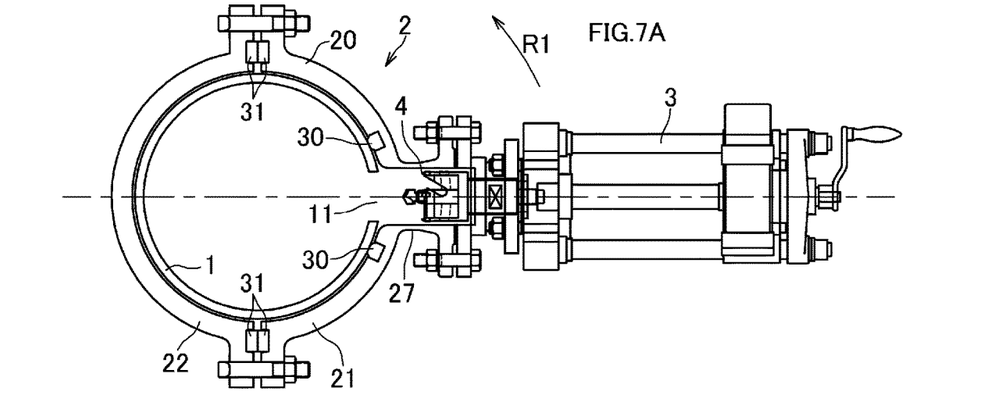
FIG. 7A and FIG. 7B are horizontal cross-sectional views showing a part of a process according to an alternative example.
Figure 7B:
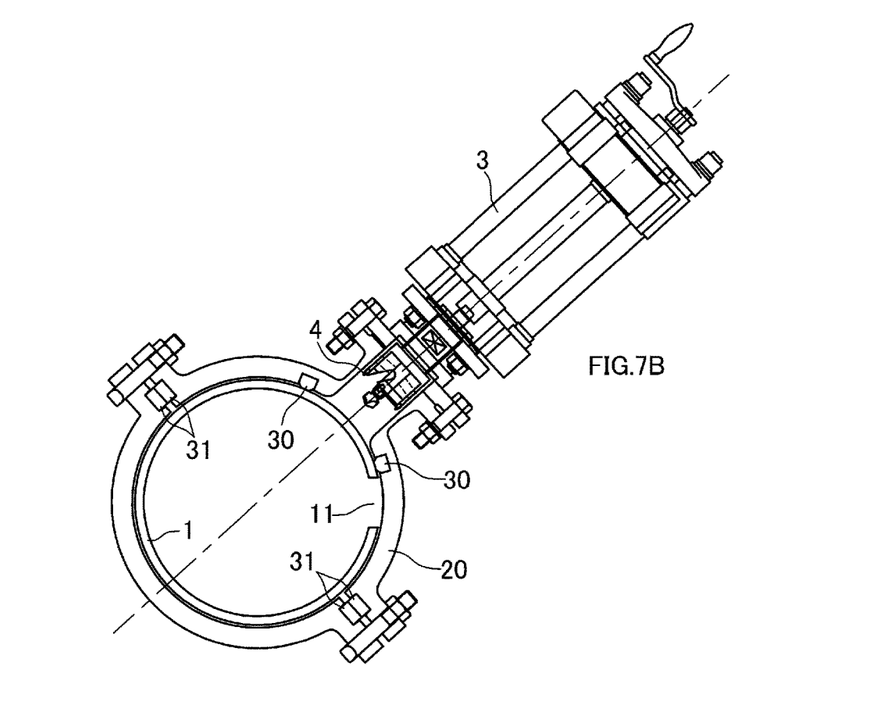

When the nominal diameter of the branching pipe is smaller than the nominal diameter of the existing pipe 1 as shown in FIG. 7A and FIG. 7B, the angle of rotation in the first and second rotation steps will be smaller.

In the present invention, after the removal of the boring machine 3 of FIG. 3B, an anticorrosion bush inserting machine may be attached to the first separate case 21 so as to insert a bush into the opening 11 after the second rotation step. Also, something other than a butterfly valve may be connected to the first separate case 21.

While preferred embodiments have been described above with reference to the drawings, various obvious changes and modifications will readily occur to those skilled in the art upon reading the present specification.

While the sealing case is divided into two pieces of the first and second separate cases in the examples described above, the sealing case may be divided into three or more pieces.

The sealing case may be a cast product or may be formed by a steel plate. Where the sealing case is formed by a steel plate, the two separate cases may be integrated together into the sealing case by welding the first and second separate cases which are tentatively assembled together.

Thus, such changes and modifications are deemed to fall within the scope of the present invention, which is defined by the appended claims.

INDUSTRIAL APPLICABILITY

The flow-undisrupted process of the present invention can be used for boring a hole in an existing pipe, in addition to providing a branch off of an existing pipe of water, gas, etc., and also.

DESCRIPTION OF THE REFERENCE NUMERALS

1: Existing pipe, 11: Opening, 12: Pipe wall, 13: Outer periphery surface of existing pipe, 14: Cut piece
2: Branching unit (tee)
3: Boring machine, 3L: Axis, 4: Hole saw, 41: Center drill
20: Sealing case, 21: First separate case, 22: Second separate case
23, 24: Packing attachment portion, 25: Coupling portion, 26: Cylindrical portion
27: Branch pipe portion (an example of the projecting pipe portion), 27L: Axis of branch pipe portion, 28: Branch hole
29: Inner periphery surface
30: Ring packing, 31: Case packing, 32: Bolt, 33: Joint portion
71: Joint portion
80: Butterfly valve, 81: Valve body, 82: Valve housing, 83: Joint portion, 84: Bolt
8L: Axial direction
C: Radial direction
R: Circumferential direction, R1: First direction, R2: Second direction

The invention claimed is:

1. A flow-undisrupted process using a tee configured to form an opening in a pipe wall of an existing pipe by boring a portion of the pipe wall by means of a boring machine having a hole saw, the tee comprising:
   a sealing case including a plurality of separate cases separated from each other in a circumferential direction of the existing pipe and configured to enclose a portion of the existing pipe, the sealing case also including a projecting pipe portion formed integral with a first separate case of the plurality of separate cases, the projecting pipe portion projecting in a radial direction of the existing pipe; and
   at least one seal packing configured to seal between an inner periphery surface of the sealing case and an outer periphery surface of the existing pipe over an area inclusive of the opening;
the flow-undisrupted process comprising:
   a step of enclosing the portion of the existing pipe with the sealing case;
   a step of connecting the boring machine to the sealing case in a non-valve state in which no operation valve is interposed between the projecting pipe portion of the sealing case and the boring machine;
   a boring step of forming the opening, which is circular, in an area of the existing pipe corresponding to the projecting pipe portion by means of the hole saw of the boring machine;
   after the boring step, a first rotation step of rotating the tee and the boring machine in the circumferential direction of the existing pipe to a position at which the projecting pipe portion is completely past the opening;
   after the rotation, a sealing step of maintaining a sealed state in which the at least one seal packing prevents a pressure of a fluid inside the existing pipe from being applied to the projecting pipe portion; and
   a step of removing the boring machine from the projecting pipe portion in the sealed state.

2. The flow-undisrupted process according to claim 1, further comprising:
   a step of connecting a butterfly valve to the projecting pipe portion from which the boring machine has been removed; and
   a second rotation step of rotating the butterfly valve and the tee in the circumferential direction of the existing pipe to a position at which a valve body of the butterfly valve in a valve-closed state covers the opening.

3. The flow-undisrupted process according to claim 2, wherein:
   in the first rotation step, the tee and the boring machine are rotated by a first angle in a first direction of the circumferential direction; and
   in the second rotation step, the tee and the butterfly valve are rotated by about the same amount as the first angle in a second direction, which is opposite to the first direction.

4. The flow-undisrupted process according to claim 3, wherein:
   the existing pipe, buried in the ground, is partially exposed through digging;
   in the boring step, an axis of the boring machine is set in a horizontal direction orthogonal to a pipe axis direction of the existing pipe; and
   in the first rotation step, the tee and the boring machine are rotated in the first direction, which is upward, of the circumferential direction.

5. The flow-undisrupted process according to claim 1, the at least one seal packing comprising:
   a case packing each attached to the first separate case and another separate case different from the first separate case and configured to seal between the first separate case and the other separate case and also seal between the inner periphery surface of the sealing case and the outer periphery surface of the existing pipe; and a ring packing attached to the first separate case so as to enclose the opening and configured to seal between the projecting pipe portion of the first separate case and the existing pipe, wherein in the sealing step, the sealed state is maintained by the ring packing.

\* \* \* \* \*